United States Patent
Asai

[19]

[11] Patent Number: 5,939,162
[45] Date of Patent: *Aug. 17, 1999

[54] BONDED COMPOSITE DISK OF SINGLE-SIDE RECORDED TYPE, AND METHOD AND APPARATUS FOR PRODUCING THE SAME WITH HIGH THICKNESS ACCURACY

[75] Inventor: Ikuo Asai, Nagoya, Japan

[73] Assignee: Kabushiki Kaisha Meiki Seisakusho, Japan

[ * ] Notice: This patent is subject to a terminal disclaimer.

[21] Appl. No.: 08/873,744

[22] Filed: Jun. 18, 1997

[51] Int. Cl.$^6$ ....................................................... B32B 3/00
[52] U.S. Cl. ...................... 428/64.1; 428/64.2; 428/64.7; 428/65.2; 428/913; 430/270.1; 430/495.1; 430/945; 425/543; 156/60
[58] Field of Search ................................. 428/64.1, 64.2, 428/64.3, 64.7, 65.2, 66.6, 913; 430/270.1, 495.1, 945; 425/542, 543, 547; 156/60, 228; 264/2.5

[56] References Cited

U.S. PATENT DOCUMENTS 5,460,763 10/1995 Asai ......................................... 264/107
5,476,700 12/1995 Asai ......................................... 428/66.6
5,718,960 2/1998 Asai ......................................... 428/64.1

*Primary Examiner*—Elizabeth Evans
*Attorney, Agent, or Firm*—Parkhurst & Wendell, L.L.P.

[57] ABSTRACT

Method and apparatus for producing a bonded composite disk including a first and a second disk component which are bonded together, using a mold including a first mold half having first concentric elements whose axial end faces cooperate with an annular information-bearing stamper or an annular blank stamper, to provide a first molding surface, and a second mold half having a second concentric elements whose axial end faces provide a second molding surface cooperating with the first molding surface to define a cavity for forming each of the first and second disk components. The diameters of first annular boundaries between the end faces of the adjacent first concentric elements are different from those of second annular boundaries between the end faces of the adjacent second concentric elements, and the first disk component formed with the information-bearing stamper set on the first mold half is bonded at a first bonding surface formed by the first molding surface to a second bonding surface of the second disk component that is formed by the second molding surface with the blank stamper set on the first mold half.

10 Claims, 4 Drawing Sheets

BONDED COMPOSITE DISK OF SINGLE-SIDE RECORDED TYPE, AND METHOD AND APPARATUS FOR PRODUCING THE SAME WITH HIGH THICKNESS ACCURACY

The present application is based on Japanese Patent Application No. 8-17726 filed Feb. 2, 1996, the content of which is incorporated hereinto by reference.

CROSS REFERENCE TO RELATED APPLICATIONS

U.S. patent application Ser. No. 08/595,801 filed Feb. 2, 1996.

BACKGROUND OF THE INVENTION

1. Field of the Invention

The present invention relates in general to techniques associated with a bonded composite disk such as a digital video disk (DVD), which is produced by bonding together two separately formed disk components. More particularly, this invention is concerned with an improved structure of a bonded composite disk of the type in which only one of the two disk components has an information-bearing surface while the other disk component serves as a dummy disk component which does not have an information-bearing surface. This type of bonded composite disk is referred to as a bonded composite disk of single-side recorded type. This invention also concerns with improvements of a method of producing the bonded composite disk, and a mold for forming the two separate disk components that are bonded together to produce the bonded composite disk.

2. Discussing of the Related Art

A bonded composite disk consisting of two separately formed disk components that are bonded together has recently been developed in an effort to provide a disk having increased data storage capacity. Such a bonded composite disk finds industrial applications as a digital video disk (DVD), for example. This bonded composite disk is capable of storing a large volume of information, for example, information for a long film or movie, on two information-bearing surfaces thereof which are formed on respective two separately formed disk components. The bonded composite disk may be used to store an ordinary amount of information, for example, information for an ordinary film. In this case, only one of the information-bearing surfaces is used to store the data. Namely, the bonded composite disk is usable as the composite disk of single-side recorded type. The bonded composite disk of a single-side recorded type consists of a first disk component having an information-bearing surface on one of its opposite surfaces and a second disk component without an information-bearing surface. The first and second disk components are superposed on each other at their information-bearing surfaces. The bonded composite disk of single-side recorded type is usually produced by forming the first and second disk components of a resin material using a mold as used for forming an ordinary disk, such that each of the formed first and second disk components has a thickness slightly smaller than a half of the nominal thickness of the composite disk to be produced. A reflector film and a protective film are formed on the information-bearing surface of the first disk component. Then, the second disk component is superposed on the information-bearing surface of the first disk component with a layer of a bonding adhesive applied therebetween, so that the disk components are bonded together into the bonded composite disk of single-side recorded type.

Such an adhesive layer interposed between the first and second disk components may advantageously function to accommodate a thickness variation of the bonded composite disk from its nominal value, if the thickness of the adhesive layer is sufficiently large. In some cases, however, the thickness of the adhesive layer cannot be made sufficiently large due to particular properties of the adhesive material and/or required dimensional specifications of the bonded composite disk. For example, where a digital video disk (DVD) is produced using a bonding adhesive which is curable by exposure to a ultraviolet radiation (UV-curable adhesive), it is generally difficult to form the adhesive layer with a thickness larger than 40 $\mu$m due to the properties of the UV-curable adhesive, for example, a photosensitive polymer.

Although the adhesive layer having a relatively small thickness may satisfy the requirements of the first and second disk components in terms of their configuration and dimensional accuracy, the small thickness of the adhesive layer may cause poor bonding and low thickness accuracy of the bonded composite disk consisting of the first and second disk components. Thus, the prior art disk suffers from a problem of a relatively high ratio of rejects. Although poor bonding and low thickness accuracy of the bonded composite disk do not cause a serious problem in the research and development stage of such bonded composite disk, they are considered to be a considerable barrier to achieve adequate production of the bonded composite disk on a commercial basis.

SUMMARY OF THE INVENTION

It is therefore a first object of the present invention to provide a bonded-composite disk wherein only one of the two disk components has an information-bearing surface (hereinafter referred to as "a bonded composite disk of single-side recorded type"), having a novel structure which permits improved production efficiently and yield ratio (reduced ratio of rejects).

A second object of this invention is to provide a method suitable for producing the bonded composite disk of single-side recorded type having such a novel structure.

A third object of the invention is to provide an apparatus suitable for producing a first and a second disk components which are used to produce such an improved bonded composite disk of single-side recorded type.

The present invention was made as a result of extensive experiments and studies on a bonded composite disk, which revealed that the high ratio of rejects or low yield ratio of the bonded composite disk in the prior art is likely to arise from burrs which are formed with a relatively small height on the first and second disk components during formation thereof using the mold.

Generally, the mold for forming the first and second disk components separately from each other includes a stationary mold half fixed to a stationary member of a suitable clamping device, and a movable mold half fixed to a stationary member of the clamping device. The movable and movable mold halves have respective first and second molding surfaces cooperating to define therebetween a mold cavity for forming each of the disk components. On one of the first and second molding surfaces, there is fixed an annular stamper whose information is to be reproduced on one of the disk components. Usually, each of the first and second molding surfaces is defined by axial end face of a mirror block and axial end faces of mutually concentric components, which extend through the axially center portion of the mirror block, such as the annular stamper, a female cutter sleeve, an ejector sleeve, a stationary guide sleeve and an annular stamper holder. The adjacent ones of the mutually concentric components inevitably have a clearance or gap therebetween of at least 10 μm. In particular, the clearances between the axially reciprocated ejector sleeve and the adjacent components should be as large as 10–30 μm. Therefore, a resin material for the disk components is likely to flow into those clearances when the disk component is formed by filling the mold cavity with the resin material. Thus, annular burrs having a relatively small height are likely to be formed on the surfaces of the first and second disk components. Experiments conducted by the present inventor showed the formation of an annular burr on a portion of the formed disk component which corresponds to a boundary between the ejector sleeve and the stationary guide sleeve, and the formation of an annular burr on a portion of the formed disk component which corresponds to a boundary between the stationary guide sleeve and the annular stamper holder. The former burr had a maximum height of 20–30 μm while the latter burr had a maximum height of 15–25 μm, where the disk components were formed of a polycarbonate material.

In the presence of such annular burrs formed on the first and second disk components formed by the conventional mold, the two disk components cannot be adequately bonded together with a bonding adhesive. Namely, even if the disk components formed have the desired shape and thickness dimensions within a predetermined tolerance, the thickness of the bonding adhesive, that is the distance between the bonding surfaces of the two disk components cannot be consistently controlled to a value close to the nominal value, because the annular burrs on the two disk components abut on each other. Consequently, the produced bonded composite disk tends to suffer from poor bonding of the two disk components and a high ratio of rejects due to excessive deviation of the thickness dimension of the composite disk from the nominal value. The present invention was developed in the light of the above finding.

The first object indicated above may be achieved according to a first aspect of this invention, which provides a bonded composite disk of single-side recorded type including a first disk component and a second disk component which are formed separately from each other, by selectively using an annular information-bearing stamper and an annular blank stamper, respectively, in a mold including a first mold half having a plurality of first concentric elements, and a second mold half having a plurality of second concentric elements, the information-bearing stamper used for the first disk component having an information-bearing surface which stores information to be reproduced on the first disk component, while the blank stamper having a disk forming surface which stores no information, the bonded composite disk being produced by a method comprising the steps of: (a) preparing the mold such that axial end faces of the first concentric elements of the first mold half cooperate with the information-bearing surface of the information-bearing stamper or the disk forming surface of the blank stamper to provide a first molding surface, while axial end faces of the second concentric elements of the second mold half provide a second molding surface which cooperates with the first molding surface to define a cavity for forming each of the first and second disk components, and such that diameters of first annular boundaries between the axial end faces of adjacent ones of the first concentric elements are different from those of the second annular boundaries between the axial end faces of adjacent ones of the second concentric elements, at least within an area corresponding to a center hole of the annular information-bearing stamper or the annular blank stamper; (b) forming the first disk component in the mold, with the information-bearing stamper set on the first mold half such that the information-bearing surface provides a part of the first molding surface; (c) forming the second disk component in the mold, with the blank stamper set on the first mold half such that the disk forming surface provides a part of the first molding surface; and (d) bonding together the first and second disk components with a layer of a bonding adhesive interposed between one of opposite surfaces of the first disk component which has been formed by the first molding surface, and one of opposite surfaces of the second disk component which has been formed by the second molding surface.

The information-bearing stamper and the blank stamper, which are annular disks usually having a relatively small thickness, are placed on the appropriate surface of the first mold half and held in place by a suitable retainer mechanism, so that the information-bearing surface or disk forming surface constitutes a part of the first molding surface of the mold cavity. The information-bearing stamper stores, on its information-bearing surface, information in the form of pits or grooves, which is to be reproduced or copies on the surface of the first disk component at which the first disk component is bonded to the second disk component. On the other hand, the blank stamper does not have any information to be reproduced on the second disk component, and has the disk forming surface in the form of a mirror polished surface, for example. This disk forming surface forms the surface of the second disk component which is opposite to the surface bonded to the first disk component. The first and second molding surfaces cooperate with each other to firm the cavity when the first and second mold halves are placed in the closed position. The molding surfaces do not include the surfaces of elements located within the center hole of the annular stamper, such as a sprue bushing for injecting the material into the mold cavity. The "area corresponding to the center hole" of the annular stamper is interpreted to mean the area which is radially inward of the inner periphery of the annular stamper and which does not include that inner periphery and its vicinity.

In the present bonded composite disk of single-side recorded type of the present invention described above, the first and second disk components are bonded together at their surfaces formed by the first and second molding surfaces, respectively. Since the first and second annular boundaries have different diameters, namely, are located at different radial positions, the burrs which may be formed along those annular boundaries are offset or spaced apart from each other in the radial direction, whereby the burrs on the first disk component and the burrs on the second disk component do not interfere with each other.

In the absence of interference of the burrs on the first and the second disk components, these two disk components can be bonded together with the adhesive layer interposed therebetween, so that the bonded composite disk has a thickness substantially equal to the desired or nominal value, and has a sufficient bonding strength, leading to a significantly reduced ratio of rejects due to insufficient bonding strength and thickness accuracy of the bonded composite disk.

The second object indicated above may be achieved according to a second aspect of this invention, which provides a method of producing a bonded composite disk of single-side recorded type including a first disk component and a second disk component which are formed separately from each other, by selectively using an annular information-bearing stamper and an annular blank stamper, respectively, in a mold including a first mold half having a plurality of first concentric elements, and a second mold half having a plurality of second concentric elements, the information-bearing stamper used for the first disk component having an information-bearing surface which stores information to be reproduced on the first disk components, while the blank stamper having a disk forming surface which stores no information, the method comprising the steps of: (a) preparing the mold such that axial end faces of the first concentric elements of the first mold half cooperate with the information-bearing surface of the information-bearing stamper or the disk forming surface of the blank stamper to provide a first molding surface, while axial end faces of the second concentric elements of the second mold half provide a second molding surface which cooperates with the first molding surface to define a cavity for forming each of the first and second disk components, and such that diameters of first annular boundaries between the axial end faces of adjacent ones of the first concentric elements are different from those of second annular boundaries between the axial end faces of adjacent ones of the second concentric elements, at least within an area corresponding to a center hole of the annular information-bearing stamper or the annular blank stamper; (b) forming the first disk component in the mold, with the information-bearing stamper set on the first mold half such that the information-bearing surface to provides a part of the first molding surface; (c) forming the second disk component in the mold, with the blank stamper set on the first mold half such that the disk forming surface provides a part of the first molding surface; and (d) bonding together the first and second disk components with a layer of a bonding adhesive interposed between one of opposite surfaces of the first disk component which has been formed by the first molding surface, and one of opposite surfaces of the second disk component which has been formed by the second molding surface.

According to the method of the present invention, the bonded composite disk is formed by the mold in which the first and second annular boundaries on the first and second molding surfaces are radially offset or spaced part from each other. Since the first and second disk components are bonded together at their surfaces formed by the first and second molding surfaces, the burrs which may be formed on the bonding surfaces of the first and second disk components are offset from each other in the radially direction of the bonded composite disk.

Therefore, the present method permits the production of the bonded composite disk with the desired thickness and a sufficient bonding strength of the first and second disk components, without an interference of the burrs, assuring a significantly reduced ratio of rejects due to insufficient bonding strength or poor thickness accuracy.

The third object indicated above may be achieved according to a third aspect of this invention, which provides an apparatus for forming a first disk component and a second disk component which are bonded together with a layer of a bonding adhesive to produce a bonded composite disk, the apparatus comprising: (a) a mold including a first mold half having a plurality of first concentric elements whose axial end faces provide a part of a first molding surface, and a second mold half having a plurality of second concentric elements whose axial end faces provide a second molding surface which cooperates with the first molding surface to define a cavity for forming each of the first and second disk components; (b) an annular information-bearing stamper to be set on the first mold half for forming the first disk component, the information-bearing stamper having an information-bearing surface which stores information to be reproduced on one of opposite surfaces of the first disk component, the information-bearing surface cooperating with the axial end faces of the first concentric elements to provide the first molding surface; and (c) an annular blank stamper to be set on the first mold half for forming the second disk component, the annular blank stamper having a disk forming surface which stores no information, the disk forming surface cooperating with the axial end faces of the first concentric elements to provide the first molding surface, and wherein the annular information-bearing stamper and the annular blank stamper are selectively used at different times to form the first and second disk components respectively.

The apparatus of the present invention described above permits the production of the first and second disk components whose annular burrs if formed on their bonding surfaces are radially offset or spaced apart from each other, if the first and second mold halves used for forming the disk components are constructed so as to have the respective first and second molding surfaces on which first and second annular boundaries of the concentric elements of the mold halves have different diameters and are radially offset from each other, and if the first and second disk components are bonded together at their surfaces which are formed by the first and second molding surface, respectively.

Since the annular burrs on the bonding surfaces are radially offset from each other, these burrs do not interfere with each other when the first and second disk components are bonded together. Accordingly, the disk components can be bonded together so as to assure improved accuracy of the distance between the bonding surfaces, namely, improved thickness accuracy of the bonded composite disk, and increased bonding strength of the two disk components, leading to a significantly reduced ratio of rejects due to insufficient bonding strength and thickness accuracy of the bonded composite disk.

BRIEF DESCRIPTION OF THE DRAWINGS

The above and other objects, features, advantages and technical and industrial significance of the present invention will be better understood by reading the following detailed description of a presently preferred embodiment of the invention, when considered in connection with the accompanying drawings, in which.

DETAILED DESCRIPTION OF THE PREFERRED EMBODIMENT

Figure 1:
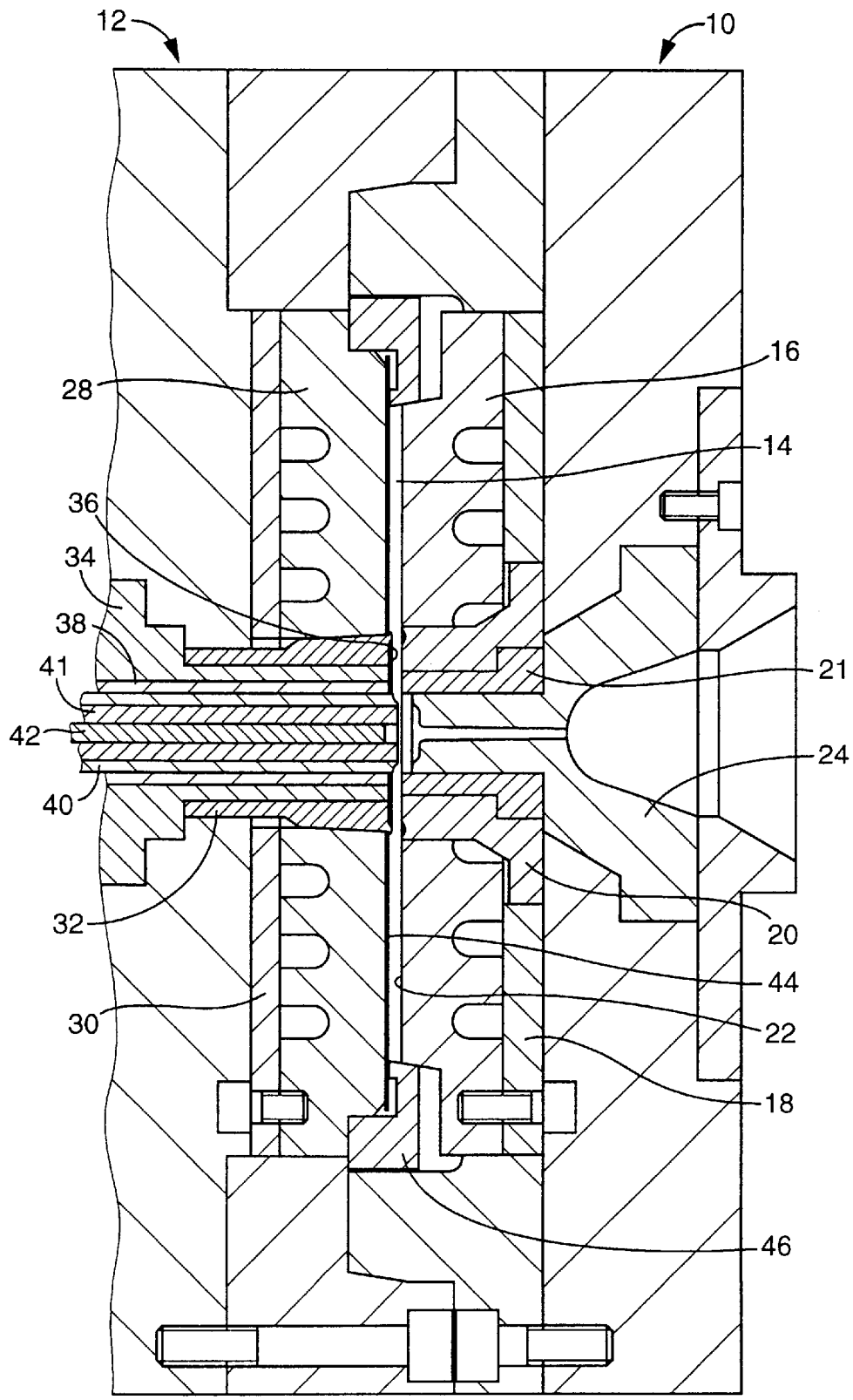
FIG. 1 is a fragmentary view in longitudinal cross section of a mold constructed and used according to one embodiment of this invention for forming a first and a second disk component which are bonded together to produce a bonded composite disk.

Referring first to FIG. 1, there is shown a mold for separately forming a first disk component and a second disk component which are bonded together to produce a bonded composite disk of single-side recorded type. The mold has a stationary mold half 10 and a movable mold half 12. The stationary mold half 10 is attached to a stationary member of a mold clamping device (not shown), while the movable mold half 12 is attached to a movable member of the mold clamping device, as well known in the art. The movable member of the mold clamping device is movable toward and away from the stationary member, so that the movable mold half 12 is movable toward and away from the stationary mold half 10. Thus, the mold has an open position and a closed position.

In the closed position of FIG. 1 in which the stationary and movable mold halves 10, 12 are located close to each other, there is defined a mold cavity 14 therebetween, for forming the first or second disk component of the bonded disk component. Namely, the mold consisting of the stationary and movable mold halves 10, 12, as shown in FIG. 1, is adapted to separately form a first disk component 50 (FIG. 3) which has an information-bearing surface and a second disk component 52 (FIG. 3) serving as a dummy disk which does not have an information-bearing surface. On the information-bearing surface of the first disk component 50, there is formed a light reflection film and other films as needed. Further, an adhesive layer 55 of a bonding adhesive is applied to the bonding surfaces of the first and second disk components 50, 52, which will be described, and the two disks 50, 52 are superposed on each other with the adhesive layer 55 contacting each other. Thus, the desired bonded composite disk of single-side recorded type that may be used as a DVD (digital video disk) is produced.

To the body of the stationary mold half 10, there is fixed an annular stationary mirror block 16 through a back plate 18. The stationary mirror block 16 has a relatively large wall thickness and an annular mirror surface which partly defines the mold cavity 14. An outer bushing 20 extends through central portions of the annular stationary mirror block 16 and the back plate 18, in the axial direction of the annular block 16. The outer bushing 20 has a center bore in which is received a female cutter sleeve 21 used to remove a central portion of the first or second disk component 50, 52 to be formed by the mold. The female cutter sleeve 21 has a center bore in which is received a portion of a sprue bushing 24.

The stationary mold half 10 has a second molding surface 22, which is provided by the annular mirror surface of the stationary mirror block 16 and the axial end faces of the outer bushing 20 and female cutter sleeve 21 that are concentric or coaxial with the mirror block 16. In the mold constructed according to this embodiment of the present invention, the mold cavity 14 partially defined by the second molding surface 22 of the mold half 10 is filled with a resin material, which is injected into the mold cavity 14 through the sprue bushing 24 connected to a nozzle of an injecting device. To facilitate removal of the formed first or second disk component 50, 52 from the mold half 10 upon opening of the mold halves 10, 12, a stream of compressed air is applied to the second molding surface 22 through a clearance or gap between the female cutter sleeve 21 and the outer bushing 20.

To the body of the movable mold half 12, there is fixed an annular movable mirror block 28 through a back plate 30. Like the stationary mirror block 16 of the stationary mold half 10, the movable mirror block 28 has a relatively large wall thickness and an annular mirror surface which partly defines the mold cavity 14. A stamper holder 32 extends through central portions of the annular movable mirror block 28 and the back plate 30, in the axial direction of the annular mirror block 28. The stamper holder 32 is a generally cylindrical sleeve having a tapered end portion received in the center bore of the mirror block 28. The stamper holder 32 is secured to the body of the movable mold half 12 by screws or other suitable fastening fasteners.

The stamper holder 32 has a center bore in which is received a portion of a stationary guide sleeve 34 fixed to the mold half 12. The stationary guide sleeve 34 has a center bore in which is slidably movably received an ejector sleeve 38 for removing the formed disk component 50, 52 from the movable mold half 12. The ejector sleeve 38 is axially reciprocable by a suitable drive mechanism by a predetermined distance, while being guided by the inner surface of the stationary guide sleeve 34. The ejector sleeve 38 has a center bore in which is axially slidably received a male cutter sleeve 40 which cooperates with the female cutter sleeve 21 of the stationary mold half 10 to remove the central portion of the formed disk component 50, 52, for thereby forming a center hole in the disk component. The male cutter sleeve 40 has a center bore in which is received a reciprocating sleeve 41. This reciprocating sleeve 41 is axially reciprocated together with the male cutter sleeve 40 by a suitable drive mechanism. The reciprocating sleeve 41 has a center bore in which is axially slidably received an ejector pin 42 that can project from the axial end face of the male cutter sleeve 40 toward the stationary mold half 10, for removing the central portion of the disk component 50 52 which has been removed by the female and male cutter sleeves 21, 40.

Figure 2:
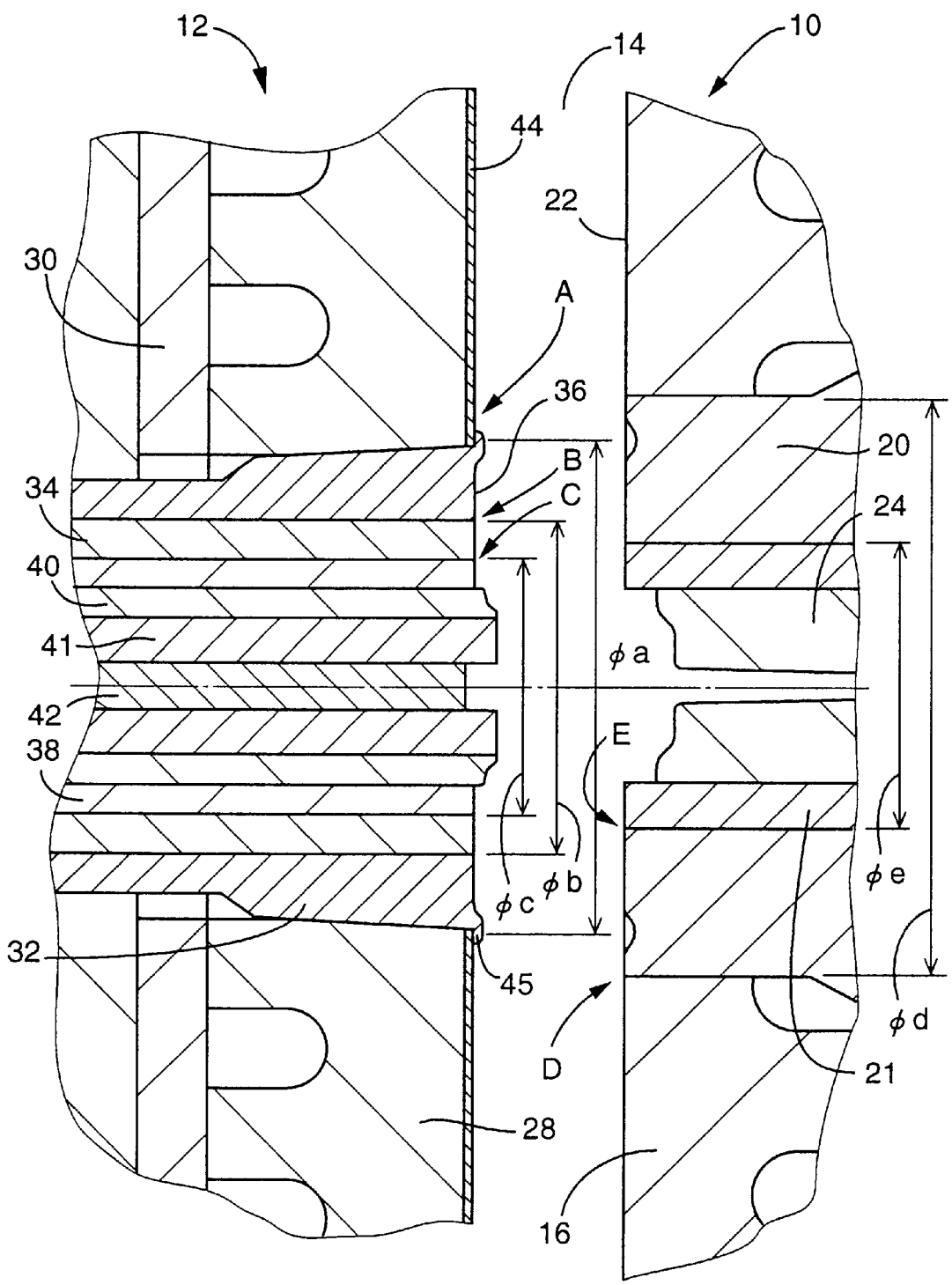
FIG. 2 is an enlarged view showing a part of the mold of FIG. 1.

A stamper 44 in the form of a relatively thin annular plate is placed on the annular mirror surface of the movable mirror block 28. As shown in FIG. 2, the annular stamper 44 is clamped at its inner circumferential edge by an annular retainer portion 45 of the stamper holder 32. The annular retainer portion 45 is formed along the outer edge of the annular axial end face of the stamper holder 32. The stamper 44 is clamped at its outer peripheral portion by an outer retainer ring 46 fixed to the body of the movable mold half 12, as shown in FIG. 1. Thus, the stamper 44 is held on the mirror surface of the movable mirror block 28.

The movable mold half 12 provided with the stamper 44 has a first molding surface 36 provided by the annular surface of the stamper 44 and the axial end faces of the stamper holder 32, stationary guide sleeve 34, and ejector sleeve 38 that are concentric or coaxial with the annular stamper 44. To facilitate removal of the formed disk component 50, 52, a stream of compressed air is supplied to the first molding surface 36 through a clearance between the ejector sleeve 38 and the stationary guide sleeve 34.

In the present embodiment, the movable mold half 12 constitutes one of a pair of mold halves which has the stamper 44, while the stationary mold 10 constitutes the other mold half without the stamper 44.

The axial end faces of the stamper holder 32, stationary guide sleeve 34 and ejector sleeve 38 are mutually concentrically located in the center hole of the stamper 44, and cooperate with the stamper 44 to define the first molding surface 36. On the first molding surface 36, there are existed annular boundaries A, B, C extending circumferentially between the adjacent elements, as indicated in FIG. 2. On the other hand, the axial end faces of the stationary mirror block 16, the outer bushing 20 and the female cutter sleeve 21 are mutually concentrically located and cooperate with each other to define the second molding surface 22. On the second molding surface 22, there are existed annular boundaries D and E extending circumferentially between the adjacent elements, as also indicated in FIG. 2. The annular boundaries A, B and C on the first molding surface 36 are dimensioned to have respective diameters φa, φb and φc, while the annular boundaries D and E on the second molding surface 22 are dimensioned to have respective diameters φd and φe. The diameter values φa, φb and φc are different from the diameter values φd and φe, so that the annular boundaries A, B, C in the movable mold half 12 are not opposed to the annular boundaries D, E in the axial direction of the mold. In the present embodiment, the dimensional relationship of the annular boundaries A, B, C, D and E is satisfied to meet the following inequality: φc<φe<φb<φa<φd. The annular retainer portion 45 has an inside diameter φa1 and an outside diameter φa2, which are determined to satisfy the following inequality: φb<φa1<φa2<φd.

Figure 3:
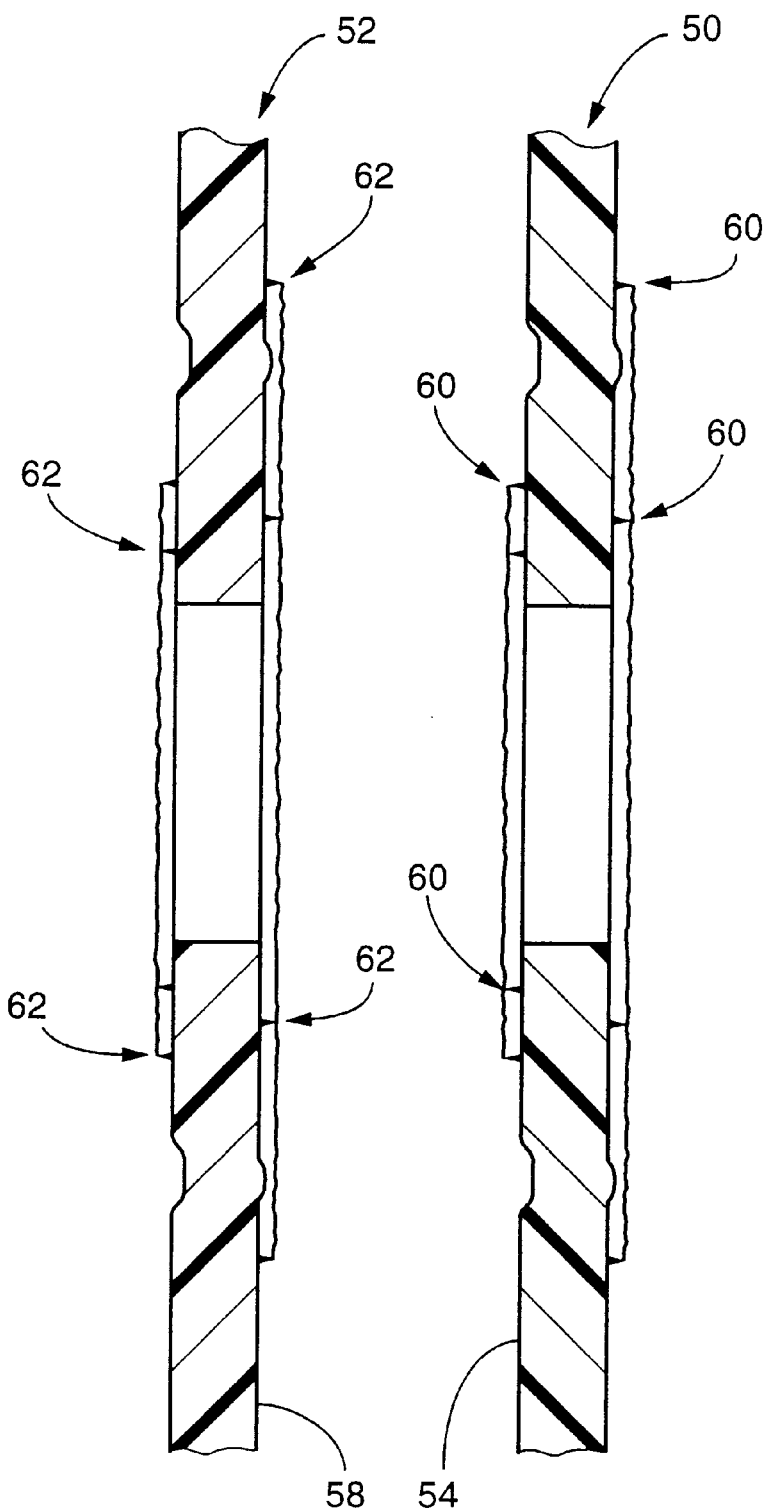
FIG. 3 is an enlarged view in cross section showing a part of each of the first and second disk components separately formed by the mold of FIG. 1.

For producing the first disk component 50 by the mold consisting of the stationary mold half 10 and the movable mold half 12, the stamper 44 having an information-bearing surface is set on the movable mold half 12. The information-bearing surface of the stamper 44 stores desired information in the form of pits or grooves, which is reproduced on the first disk component 50, and provides a part of the first molding surface 36. This stamper 44 is referred as "information-bearing stamper". For producing the second disk component 52, a stamper (not shown) which is similar to the stamper 44 but does not have an information-bearing surface is set on the movable mold half 12. This stamper has a disk forming surface which does not contact with the movable mold half 12 and provide a part of the first molding surface 36. The disk forming surface is mirror polished. This stamper is referred as "blank stamper". When the first disk component 50 is produced, the information-bearing stamper 44 is placed on the annular mirror surface of the mirror block 28 of the movable mold half 12. The stationary and movable mold halves 10, 12 are located close to each other to thereby define the mold cavity 14 therebetween. The mold cavity 14 is filled with a predetermined resin material, whereby there is formed the first disk component 50 which has an information-bearing surface on which information stored on the information-bearing stamper 44 is reproduced or copied, as shown in FIG. 3. When the second disk component 52 is produced, on the other hand, the blank stamper is placed on the mirror surface of the mirror block 28 of the movable mold half 12. The stationary and movable mold halves 10, 12 are located close to each other to thereby define the mold cavity 14 therebetween. The mold cavity 14 is filled with a predetermined resin material, whereby there is formed the second disk component 52 without an information-bearing surface, as shown in FIG. 3. Namely, the mold of the present embodiment is capable of separately producing the first disk component 50 having the information-bearing surface on which the desired information is reproduced, and the second disk component 52 which serves as a dummy disk without an information-bearing surface, by selectively using the information-bearing stamper 44 and the blank stamper.

Figure 4:
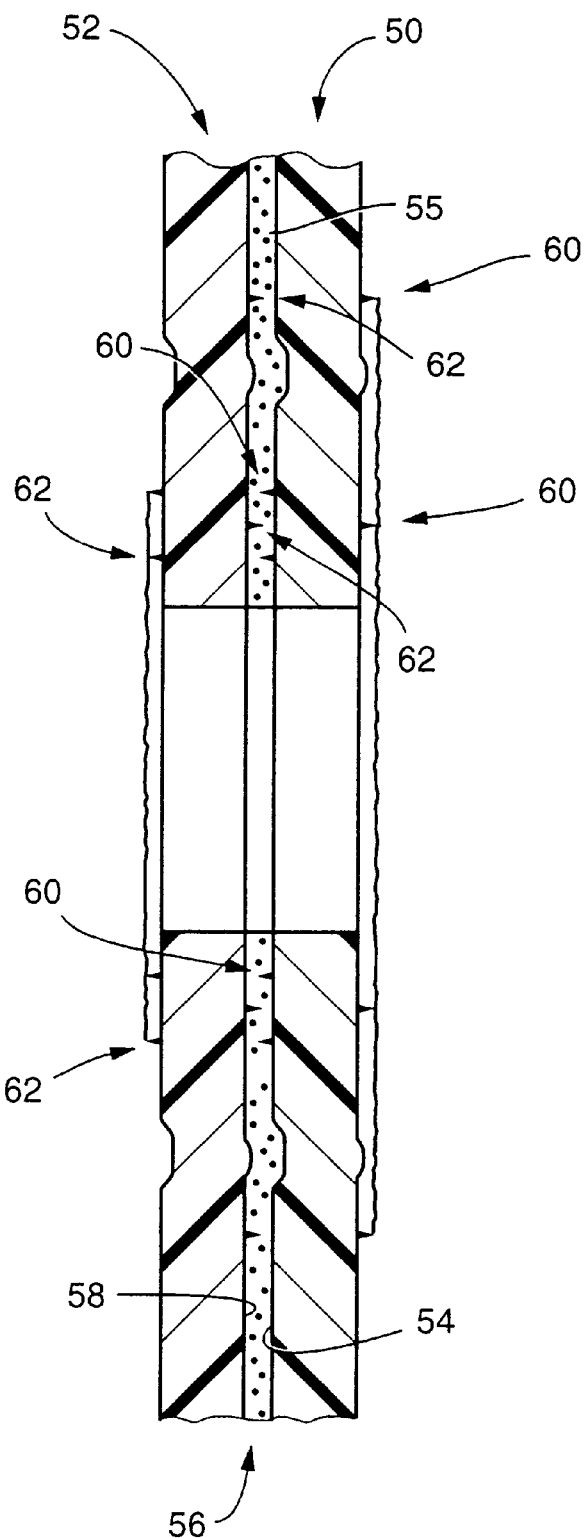
FIG. 4 is an enlarged view in cross section showing a part of an example of a bonded composite disk constructed according to the present invention.

After forming a reflector film or other films as needed, on the information-bearing surface of the first disk component 50, the first and second disk components 50, 52 are superposed on each other at a first bonding surface 54 of the first disk component 50 and a second bonding surface 58 of the second disk component 52, such that an adhesive layer 55 is interposed therebetween, as shown in FIG. 4. Thus, a desired bonded composite disk 56 is produced.

More specifically described, the first bonding surface 54 of the first disk component 50 is formed in contact with the the first molding surface 36 of the movable mold half 12, which includes the information bearing surface of the information-bearing stamper 44, while the first bonding surface 58 of the second disk component is formed in contact with the first molding surface 22 of the stationary mold half 10.

As indicated in FIG. 3, the first and second disk components 50, 52 produced by the mold constructed as described above may have annular burrs 60, 62, respectively, which extend circumferentially on the surfaces of the disk components. These annular burrs 60, 62 may be formed due to flows of the resin material through the clearance at the annular boundaries A, B, C formed between the adjacent concentric elements mutually concentrically located, i.e., the stamper 44, the stamper holder 32, the stationary sleeve 34 and the ejector sleeve 38, which cooperate to each other to partially define the first molding surface 36 of the movable mold half 12, and through the clearances at the annular boundaries D, E formed between the adjacent concentric elements mutually concentrically located, i.e., the stationary mirror block 16, the outer bushing 20 and the female cutter sleeve 21, which cooperate to each other to partly define the second molding surface 22. Because the diameters of the annular boundaries A, B, C in the first molding surface 36 of the movable mold half 12 are made different from those of the annular boundaries D, E in the second molding surface 22 of the stationary mold half 10, the annular burrs 60 formed on the first bonding surface 54 of the first disk component 50 are offset or spaced from the annular burrs 62 formed on the second bonding surface 58 of the second disk component 52 in the radial direction. Therefore, the annular burrs 60 of the first disk component 50 do not interference with the annular burrs 62 of the second disk component 52 when the two disks 50, 52 are superposed on each other with the adhesive layer 55 interposed therebetween.

If at least one of the diameters φa, φb and φc of the annular burrs 60 on the first disk component 50 was equal to at least one of the diameters φd and φe of the annular burrs 62 of the second disk component 52, and suppose the annular burrs 60, 62 formed on the respective first and second disk components 50, 52 have a height of 30 μm, for example, the annular burrs 60, 62 of the respective first and second disk components 50, 52 would abut on each other when the two disks 50, 52 are superposed on each other, and would act as a spacer which inevitably spaces the first bonding surface 54 and the second bonding surface 58 of the first and second disk components 50, 52 apart from each other by a considerably distance, and prevents the adhesive layer 55 from having a desired or nominal thickness, for example, 40 μm. In the present embodiment, however, the first disk component 50 and the second disk component 52 are produced by the mold as described above, so that the annular burrs 60 on the first disk component 50 and the annular burrs 62 of the second disk component 52 have different diameters and are offset or spaced from each other in the radial direction. Therefore, the annular burrs 60, 62, each having a thickness or height of 30 μm, for example, do not interference with each other, permitting the two disks 50, 52 to be located close to each other with the adhesive layer 55 having a desired thickness, for example, 40 μm or smaller. The thickness of the adhesive layer 55 determines the spacing between the two disks 50, 52 which determines the overall thickness of the obtained bonded composite disk.

In the present embodiment, therefore, the formed bonded composite disk has excellent bonding strength and improved accuracy of its thickness. In other words, the method of producing the composite disk using the mold constructed according to the present invention assures significantly improved production efficiency and yield ratio or reduced ratio of rejects.

While the present invention has been described in detail in its presently preferred embodiment by reference to the accompanying drawings, for illustrative purpose only, it is to be understood that the invention is not limited to the details of the illustrated embodiment.

In the illustrated embodiment, the information-bearing stamper 44 or the blank stamper is fixed to the movable mold half 12 so as to provide the first molding surface 36 to form the information-bearing surface of the first disk component 50 and a stamper contact surface of the second disk component 52. However, the stamper 44 may be fixed to the stationary mold half 10. In this case, the dimensions of the components which partially define the second molding surface 22 of the stationary mold half 10 in the mold are made different from those in the second mold.

In the illustrated embodiment, the stamper 44 is clamped on the annular mirror surface of the movable mirror block 28 by the annular retainer portion 45 of the stamper holder 32 at its inner circumferential portion. However, the stamper 44 may be attracted to the annular mirror surface of the movable mirror block 28 by air suction.

Further, the diameters of the annular boundaries between the adjacent components which partially define one of the two molding surfaces are different from those of the other molding surface, at least in the center hole of the stamper i.e., in the radially inner portion extending radially inwardly from the inner circumferential portion of the stamper 44. If the stamper 44 is clamped at its inner periphery by the annular retainer portion 45 of the stamper holder 32 as in the present embodiment, an annular burr would be scarcely formed due to flows of the resin material into the clearance between the stamper holder 32 and the inner periphery of the stamper 44. Therefore, it may be possible that any one of the annular boundaries in the second molding surface 22 has the same diameter of the annular boundary between the stamper holder 32 and the inner periphery of the stamper 44.

The components of the movable or stationary mold half which cooperate with the stamper 44 to define a molding surface for forming a first and a second disk component are not limited to the details of the illustrated embodiment, but may be suitably arranged, constructed and shaped depending upon the configuration of the mold.

It is to be understood that the present invention may be embodied with various other changes, modifications and improvements, which may occur to those skilled in the art, in the light of the foregoing teachings, without departing from the spirit and scope of the invention defined in the following claims.

What is claimed is:

1. A bonded composite disk of the single-side recorded type including a first disk component and a second disk component that are formed separately from each other, by selectively using an annular information-bearing stamper and an annular blank stamper, respectively, in a mold including a first mold half having a plurality of first concentric elements, and a second mold half having a plurality of second concentric elements, said information-bearing stamper used for said first disk component having an information-bearing surface that stores information to be reproduced on said first disk component, while said blank stamper having a disk forming surface that stores no information, said bonded composite disk being produced by a method comprising the steps of:

preparing said mold such that axial end faces of said first concentric elements of said first mold half cooperate with one of said information-bearing surface of said information-bearing stamper and said disk forming surface of said blank stamper to provide a first molding surface, while axial end faces of said second concentric elements of said second mold half provide a second molding surface that cooperates with said first molding surface to define a cavity for forming each of said first and second disk components, and such that diameters of first annular boundaries between said axial end faces of adjacent ones of said first concentric elements are different from those of second annular boundaries between said axial end faces of adjacent ones of said second concentric elements, at least within an area corresponding to a center hole of said annular information-bearing stamper or said annular blank stamp;

forming said first disk component in said mold, by setting said information-bearing stamper on said first mold half such that said information-bearing surface of said information bearing stamper provides a part of said first molding surface;

forming said second disk component in said mold, by setting said blank stamper on said first mold half such that said disk forming surface of said blank stamper provides a part of said first molding surface; and bonding together said first and second disk components with a layer of a bonding adhesive interposed between a first bonding surface of said first disk component that has been formed by said first molding surface, and a second bonding surface of said second disk component that has been formed by said second molding surface.

2. A bonded composite disk of the single-side recorded type according to claim 1, wherein said first disk component has a first annular burr in at least one area of said first bonding surface thereof, which corresponds to at least one of said first annular boundaries, while said second disk component has a second annular burr in at least one area of said second bonding surface thereof, which corresponds to at least one of said second annular boundaries.

3. A bonded composite disk of the single-side recorded type according to claim 2, wherein height dimensions of said first and second annular burrs as measured from said one of said first and second bonding surfaces are not greater than a thickness of said layer of the bonding adhesive.

4. A method of producing a bonded composite disk of the single-side recorded type including a first disk component and a second disk component that are formed separately from each other, by selectively using an annular information-bearing stamper and an annular blank stamper, respectively, in a mold including a first mold half having a plurality of first concentric elements, and a second mold half having a plurality of second concentric elements, said information-bearing stamper used for said first disk component having an information-bearing surface that stores information to be reproduced on said first disk components, and said blank stamper having a disk forming surface that stores no information, said method comprising the steps of:

preparing said mold such that axial end faces of said first concentric elements of said first mold half cooperate with one of said information-bearing surface of said information-bearing stamper and said disk forming surface of said blank stamper to provide a first molding surface, while axial end faces of said second concentric elements of said second mold half provide a second molding surface that cooperates with said first molding surface to define a cavity for forming each of said first and second disk components, and such that diameters of first annular boundaries between said axial end faces of adjacent ones of said first concentric elements are different from the diameters of second annular boundaries between said axial end faces of adjacent ones of said second concentric elements, at least within an area corresponding to a center hole of said annular information-bearing stamper or said annular blank stamper;

forming said first disk component in said mold, by setting said information-bearing stamper on said first mold half such that said information-bearing surface of said information bearing stamper provides a part of said first molding surface;

forming said second disk component in said mold, by setting said blank stamper on said first mold half such that said disk forming surface of said blank stamper provides a part of said first molding surface; and bonding together said first and second disk components with a layer of a bonding adhesive interposed between a first bonding surface of said first disk component that has been formed by said first molding surface, and a second bonding surface of said second disk component that has been formed by said second molding surface.

5. A method according to claim 4, wherein said plurality of mutually concentric elements of said first mold half include an annular stamper holder for holding one of said information-bearing stamper and said blank stamper, and at least one member disposed radially inwardly of said annular stamper holder, said plurality of second concentric elements of said second mold half includes a bushing and a cutter sleeve disposed radially inward of said bushing.

6. A method according to claim 5, wherein said at least one member of said first concentric elements includes a stationary guide sleeve whose axial end face cooperates with the axial end face of said annular stamper holder to form an annular boundary whose diameter is larger than a diameter of an annular boundary between the axial end faces of said bushing and said cutter sleeve, said at least one member further including an ejector sleeve whose axial end face cooperates with the axial end face of said stationary guide sleeve to form an annular boundary whose diameter is smaller than the diameter of the annular boundary between the axial end faces of said bushing and said cutter sleeve.

7. An apparatus for forming a first disk component and a second disk component that are bonded together with a layer of bonding adhesive to produce a bonded composite disk, said apparatus comprising:

a mold consisting of a first mold half having a plurality of first concentric elements whose axial end faces provide a part of a first molding surface, and a second mold half having a plurality of second concentric elements whose axial end faces provide a second molding surface that cooperates with said first molding surface to define a cavity for forming each of said first and second disk components;

an annular information-bearing stamper to be set on said first mold half for forming said first disk component, said information-bearing stamper having an information-bearing surface that stores information to be reproduced on one of opposite surfaces of said first disk component, said information-bearing surface cooperating with said axial end faces of said first concentric elements to provide said first molding surface; and an annular blank stamper to be set on said first mold half for forming said second disk component, said annular blank stamper having a disk forming surface that stores no information, said disk forming surface cooperating with said axial end faces of said first concentric elements to provide said first molding surface, and wherein said annular information-bearing stamper and said annular blank stamper are selectively used at different times to form said first and second disk components, respectively.

8. An apparatus according to claim 7, wherein said axial end faces of adjacent ones of said first concentric elements form first annular boundaries therebetween, while said axial end faces of adjacent ones of said second concentric elements form second annular boundaries whose diameters are different from those of said first annular boundaries, at least within an area corresponding to a center hole of one of said annular information-bearing stamper and said annular blank stamper.

9. An apparatus according to claim 8, wherein said plurality of first concentric elements of said first mold half include an annular stamper holder for holding one of said information-bearing stamper and said blank stamper, and at least one member disposed radially inwardly of said annular stamper holder, said plurality of second concentric elements of said second mold half include a bushing and a cutter sleeve disposed radially inward of said bushing.

10. An apparatus according to claim 9, wherein said at least one member of said first concentric elements includes a stationary guide sleeve whose axial end face cooperates with the axial end face of said annular stamper holder to form an annular boundary whose diameter is larger than a diameter of an annular boundary between the axial end faces of said bushing and said cutter sleeve, said at least one member further including an ejector sleeve whose axial end face cooperates with the axial end face of said stationary guide sleeve to form an annular boundary whose diameter is smaller than the diameter of the annular boundary between the axial end faces of said bushing and said cutter sleeve.

* * * * *

UNITED STATES PATENT AND TRADEMARK OFFICE
CERTIFICATE OF CORRECTION

PATENT NO. : 5,939,162
DATED : August 17, 1999
INVENTOR(S) : Ikuo ASAI

It is certified that error appears in the above-indentified patent and that said Letters Patent is hereby corrected as shown below:

Title page, item [22] Filed:, change "June 18, 1997" to --June 12, 1997--.

Signed and Sealed this

Seventh Day of March, 2000

Attest:

Attesting Officer

Q. TODD DICKINSON

Commissioner of Patents and Trademarks